United States Patent [19]

(12) United States Patent
Sato et al.

(10) Patent No.: US 7,139,830 B2
(45) Date of Patent: Nov. 21, 2006

(54) COMMUNICATION APPARATUS AND CONGESTION REGULATION CONTROL METHOD

(75) Inventors: Takeshi Sato, Kanagawa (JP); Yoshihiro Kawanabe, Kanagawa (JP); Satoru Abe, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 570 days.

(21) Appl. No.: 09/773,339

(22) Filed: Jan. 31, 2001

(65) Prior Publication Data

US 2001/0034790 A1    Oct. 25, 2001

(30) Foreign Application Priority Data

Apr. 20, 2000    (JP) ............................. 2000-119625

(51) Int. Cl.
    *G06F 15/16*    (2006.01)
(52) U.S. Cl. ........................................ 709/235; 709/232
(58) Field of Classification Search ................ 709/235, 709/200, 232; 370/230
    See application file for complete search history.

(56) References Cited

U.S. PATENT DOCUMENTS

| 5,193,151 | A | * | 3/1993 | Jain ............................ 709/237 |
| 5,359,649 | A | * | 10/1994 | Rosu et al. ............. 379/221.07 |
| 5,548,533 | A | * | 8/1996 | Gao et al. .................... 709/235 |
| 5,751,969 | A | * | 5/1998 | Kapoor ........................ 709/235 |
| 5,835,484 | A | * | 11/1998 | Yamato et al. .............. 370/230 |
| 6,038,218 | A | * | 3/2000 | Otsuka et al. .............. 370/236 |
| 6,067,572 | A | * | 5/2000 | Jensen et al. ................ 709/241 |
| 6,070,190 | A | * | 5/2000 | Reps et al. ................. 709/224 |
| 6,128,506 | A | * | 10/2000 | Knutsson et al. ........... 455/522 |
| 6,424,624 | B1 | * | 7/2002 | Galand et al. .............. 370/231 |
| 6,477,143 | B1 | * | 11/2002 | Ginossar ..................... 370/230 |
| 6,578,077 | B1 | * | 6/2003 | Rakoshitz et al. .......... 709/224 |
| 6,600,720 | B1 | * | 7/2003 | Gvozdanovic .............. 370/230 |
| 6,671,257 | B1 | * | 12/2003 | Soumiya et al. ......... 370/230.1 |
| 6,901,442 | B1 | * | 5/2005 | Schwaller et al. .......... 709/224 |

FOREIGN PATENT DOCUMENTS

| JP | 62125750 | 6/1987 |
| JP | 04264862 | 9/1992 |

* cited by examiner

*Primary Examiner*—Rupal Dharia
*Assistant Examiner*—Kristie D. Shingles
(74) *Attorney, Agent, or Firm*—Katten Muchin Rosenman LLP

(57) ABSTRACT

A communication apparatus and a congestion regulation control method which execute regulation control at the time of congestion, thereby improving communication quality. A congestion monitor monitors a congestion state, sets a congestion level and determines whether or not to perform regulation based on the congestion level. Traffic measuring unit measures the number of received signals as a traffic intensity. A traffic comparitor compares the traffic intensity with a preset traffic-regulation start traffic intensity when it is determined that regulation is to be performed. A regulation control means performs traffic regulation control when a comparison result shows that the traffic intensity is equal to or greater than the traffic-regulation start traffic intensity, and performs regulation control on a maintenance and operation process when the traffic intensity is smaller than the traffic-regulation start traffic intensity.

6 Claims, 19 Drawing Sheets

CC-DUTY-CYCLE AND CONGESTION-LEVEL SETTING TABLE

T1

| CC OCCUPANCY RATE | CC-OCCUPANCY RATE ASSOCIATED CONGESTION LEVELS |
|---|---|
| CC 60% | LEVEL 1 |
| CC 70% | LEVEL 2 |
| CC 80% | LEVEL 3 |
| CC 90% | LEVEL 4 |

FIG. 2

RESPONSE-TIME AND CONGESTION-LEVEL SETTING TABLE T2

| RESPONSE TIME | RESPONSE-TIME ASSOCIATED CONGESTION LEVELS |
|---|---|
| 5 sec | LEVEL 1 |
| 7 sec | LEVEL 2 |
| 9 sec | LEVEL 3 |
| 15 sec | LEVEL 4 |

FIG. 3

T3  NUMBER-OF-REGULATION-TARGET TABLE

| CONGESTION LEVEL | NUMBER OF STATIONS TO BE REGULATED |
|---|---|
| 1 | 25 |
| 2 | 50 |
| 3 | 75 |
| 4 | 100 |

FIG. 5

T5 ORDER-OF REGULATION -TARGETS TABLE

PATTERN P1

| SENDER NUMBER #1 |
| SENDER NUMBER #3 |
| SENDER NUMBER #4 |
| ⋮ |
| SENDER NUMBER #m |

PATTERN Pn

| SENDER NUMBER #2 |
| SENDER NUMBER #7 |
| SENDER NUMBER #4 |
| ⋮ |
| SENDER NUMBER #n |

FIG. 7

| REGULATION RATIO | 25% | | | | 50% | | | | 75% | | | | 100% | | | |
|---|---|---|---|---|---|---|---|---|---|---|---|---|---|---|---|---|
| QUOTIENT OF COUNT VALUE ÷ 4 | ≦250 | | | | 250~500 | | | | 501~750 | | | | ≧751 | | | |
| REMAINDER OF COUNTER VALUE ÷ 4 | 0 | 1 | 2 | 3 | 0 | 1 | 2 | 3 | 0 | 1 | 2 | 3 | 0 | 1 | 2 | 3 |
| TRAFFIC REGULATION | ○ | ○ | ○ | × | ○ | × | ○ | × | ○ | × | × | × | × | × | × | × |

○ : NO REGULATION
× : REGULATION

FIG. 9

COMMUNICATION APPARATUS AND CONGESTION REGULATION CONTROL METHOD

BACKGROUND OF THE INVENTION

1. Field of the Invention

The present invention relates to a communication apparatus and a congestion regulation control method. More particularly, the invention relates to a communication apparatus which communicates with a plurality of stations and executes regulation control at the time of congestion, and a congestion regulation control method which communicates with a plurality of stations and executes regulation control at the time of congestion.

2. Description of the Related Art

Recently, the loads of communication networks are increasing with an increase in the number of subscribers. For instance, an overloaded state is likely to occur in a system that includes a station which is always accessed by a plurality of stations, such as an HLR (Home Location Register) station of a mobile communication network.

When such an overloaded state occurs, the call connecting capability falls, thereby adversely affecting the overall network. It is therefore necessary to reduce the load without decreasing the service quality by minimizing the adverse influence. A typical conventional technique searches for a station whose traffic is heavy when congestion occurs and controls the regulation of that station.

Because the prior art always regulates a station whose traffic is heavy, however, the regulation control is not flexible. When a disaster occurs, it is necessary to give priority to signals from stations in a disaster area where the traffic is heavy and regulate stations in light-traffic areas. The prior art does not execute flexible regulation control as to set signals from stations in such an important area free of regulation.

The prior art performs regulation control only on a target which suffers an excessive increase in the traffic of received signals. However, system congestion is not always caused by the traffic of received signals. With a high traffic which is not heavy enough to cause congestion, for example, a process of maintaining and managing the system may be invoked, thus increasing the Central Controller (hereinafter referred to as "CC") occupancy rate. This may result in congestion.

The prior art has a shortcoming such that communication by a subscriber is regulated even when congestion is caused by such a maintenance and operation process.

SUMMARY OF THE INVENTION

Accordingly, it is an object of the present invention to provide a communication apparatus which flexibly and efficiently executes regulation control at the time of congestion, thereby ensuring an improved communication quality.

It is another object of the invention to provide a congestion regulation control method which flexibly and efficiently executes regulation control at the time of congestion, thereby ensuring an improved communication quality.

To achieve the first object, according to one aspect of the invention, there is provided a communication apparatus for communicating with a plurality of stations and executing regulation control at a time of congestion. The communication apparatus comprises congestion monitoring means for monitoring a congestion state, setting a congestion level and determining whether or not to perform regulation based on the congestion level; traffic measuring means for measuring a traffic intensity; traffic comparison means for comparing the traffic intensity with a preset traffic-regulation start traffic intensity when it is determined that regulation is to be performed; and regulation control means for performing traffic regulation control when a comparison result shows that the traffic intensity is equal to or greater than the traffic-regulation start traffic intensity, and performing regulation control on a maintenance and operation process when the traffic intensity is smaller than the traffic-regulation start traffic intensity.

To achieve the second object, according to another aspect of the invention, there is provided a congestion regulation control method of communicating with a plurality of stations and executing regulation control at a time of congestion. The method comprises the steps of monitoring a congestion state, setting a congestion level and determining whether or not to perform regulation based on the congestion level; measuring a number of received signals as a traffic intensity; comparing the traffic intensity with a preset traffic-regulation start traffic intensity when it is determined that regulation is to be performed; and performing traffic regulation control when a comparison result shows that the traffic intensity is equal to or greater than the traffic-regulation start traffic intensity, and performing regulation control on a maintenance and operation process when the traffic intensity is smaller than the traffic-regulation start traffic intensity.

The above and other objects, features and advantages of the present invention will become apparent from the following description, when taken in conjunction with the accompanying drawings which illustrate preferred embodiments of the present invention by way of example.

BRIEF DESCRIPTION OF THE DRAWINGS

FIG. 2 is a diagram showing a CC occupancy rate and congestion-level setting table;

FIG. 3 is a diagram showing a response-time and congestion-level setting table;

FIG. 5 is a diagram showing a number-of-regulation-targets table;

FIG. 7 is a diagram showing an order-of-regulation-targets table;

FIG. 9 is a diagram showing one example of a regulation determining logic;

DESCRIPTION OF THE PREFERRED EMBODIMENT

Figure 1:
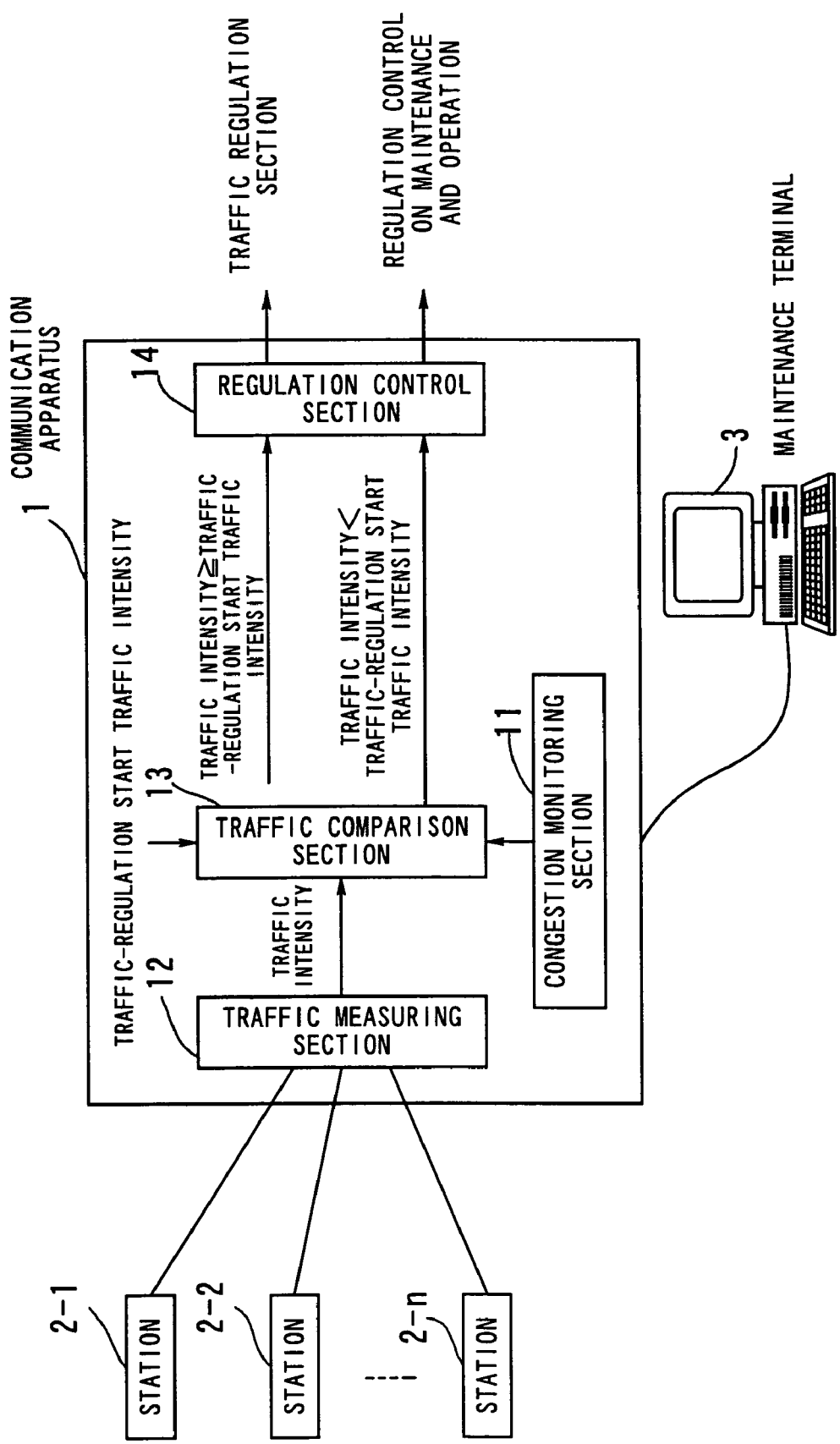
FIG. 1 is a diagram illustrating the principle of a communication apparatus according to the invention.

Preferred embodiments of the present invention will now be described with reference to the accompanying drawings. FIG. 1 is a diagram illustrating the principle of a communication apparatus 1 according to the invention. The communication apparatus 1 communicates with a plurality of stations 2-1 to 2-n and executing regulation control when congestion occurs.

A congestion monitoring section 11 monitors the congestion state of the system, sets a congestion level and determines whether or not to perform regulation based on the congestion level. In this case, the congestion monitoring section 11 uses at least one of the occupancy rate of a processor or central controller (CC) and a response time with respect to a received signal as an index at the time of setting the congestion level.

A traffic measuring section 12 measures the number of signals received from the stations 2-1 to 2-n as a traffic intensity. The traffic measuring section 12 calculates the response time (see FIG. 10 to be discussed later). A traffic comparison section 13 compares the traffic intensity with a preset traffic-regulation start traffic intensity when the congestion monitoring section 11 decides that regulation should be performed.

When the result of the comparison done by the traffic comparison section 13 shows that the traffic intensity is equal to or greater than the traffic-regulation start traffic intensity, a regulation control section 14 considers an excessive increase in the signal reception traffic as a cause for congestion and performs traffic regulation control on that target station in the stations 2-1 to 2-n which is to be regulated.

When the traffic intensity is smaller than the traffic-regulation start traffic intensity, the regulation control section 14 considers the activation of a process of maintaining and operating the system when the traffic is heavy, as a cause for congestion, and performs regulation control on the maintenance and operation process. For example, the regulation control section 14 sends an alarm or the like to a maintenance terminal 3 to stop the maintenance and operation process.

A description will now be given of how to set the congestion level based on the CC occupancy rate of the congestion monitoring section 11 and the response time with respect to a received signal. The congestion monitoring section 11 has a CC occupancy rate and congestion-level setting table T1 and a response-time and congestion-level setting table T2.

FIG. 2 shows the CC occupancy rate and congestion-level setting table T1, which is comprised of CC occupancy rate and CC occupancy rate associated congestion levels corresponding to the CC occupancy rate.

In the figure, for example, when the CC occupancy rate is 60%, the CC occupancy rate associated congestion level is 1, when the CC occupancy rate is 70%, the CC occupancy rate associated congestion level is 2, when the CC occupancy rate is 80%, the CC occupancy rate associated congestion level is 3 and when the CC occupancy rate is 90%, the CC occupancy rate associated congestion level is 4. (The larger the number on the congestion level, the higher the degree of congestion.)

FIG. 3 shows the response-time and congestion-level setting table T2, which is comprised of response times and response-time associated congestion levels corresponding to the response times.

The "response time" corresponds to a processing time in the communication apparatus 1 on a signal received from any of the stations 2-1 to 2-n until an acknowledgement is returned to that station.

In FIG. 3, for example, when the response time is 5 sec, the response-time associated congestion level is 1, when the response time is 7 sec, the response-time associated congestion level is 2, when the response time is 9 sec, the response-time associated congestion level is 3 and when the response time is 15 sec, the response-time associated congestion level is 4.

Figure 4:
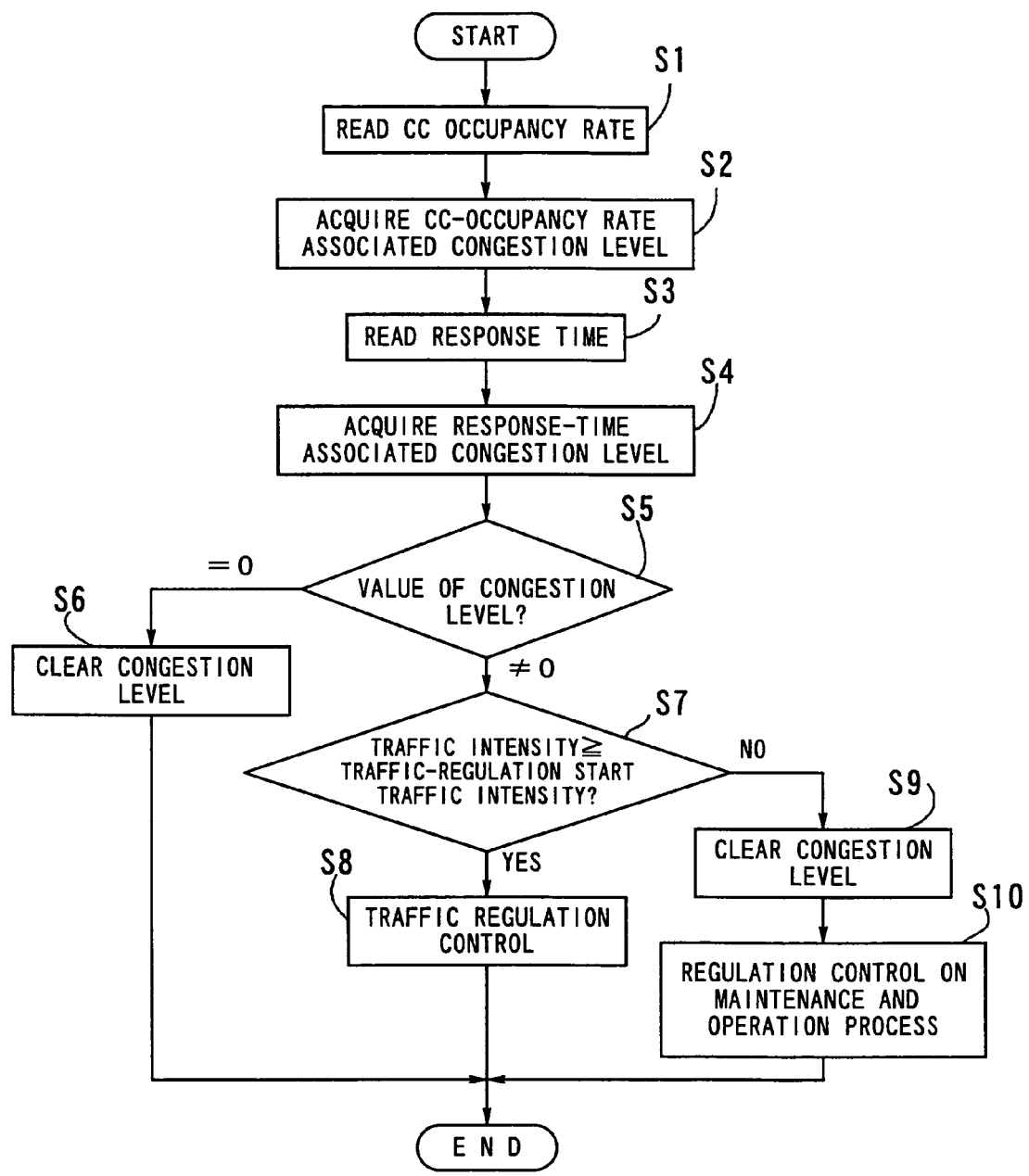
FIG. 4 is a flowchart illustrating procedures of the general operation of the communication apparatus.

The general operation of the communication apparatus 1 will now be described. FIG. 4 is a flowchart illustrating procedures of the general operation of the communication apparatus 1.

(S1) The congestion monitoring section 11 is periodically activated to read the CC occupancy rate or a load index.

(S2) The congestion monitoring section 11 acquires a CC occupancy rate associated congestion level corresponding to the read CC occupancy rate by referring to the CC occupancy rate and congestion-level setting table T1.

(S3) The congestion monitoring section 11 reads the response time which is another load index.

(S4) The congestion monitoring section 11 acquires a response-time associated congestion level corresponding to the read response time by referring to the response-time and congestion-level setting table T2.

(S5) The congestion monitoring section 11 sets either the CC occupancy rate associated congestion level or the response-time associated congestion level, whichever is higher, as the congestion level of that time (or writes the congestion level in a memory). If the congestion level is not 0, the flow proceeds to step S7. If the congestion level is 0, the flow proceeds to step S6.

(S6) The congestion monitoring section 11 clears the set congestion level.

(S7) The traffic comparison section 13 compares the present traffic intensity, which has been measured by the traffic measuring section 12, with a preset traffic-regulation start traffic intensity. When the traffic intensity is equal to or greater than the traffic-regulation start traffic intensity, the flow proceeds to step S8. When the traffic intensity is smaller than the traffic-regulation start traffic intensity, the flow proceeds to step S9.

(S8) The regulation control section 14 performs traffic regulation control.

(S9) The congestion monitoring section 11 clears the set congestion level.

(S10) The regulation control section 14 executes regulation control on the maintenance and operation process.

A detailed description will now be given of various tables in the regulation control section 14. The regulation control section 14 has a number-of-regulation-targets table T3, a regulation pattern selection table T4 and an order-of-regulation-targets table T5.

FIG. 5 shows the number-of-regulation-targets table T3, which is comprised of congestion levels and the numbers of target stations to be regulated that correspond to the congestion levels.

In the figure, for example, when the congestion level is 1, the number of target stations is 25, when the congestion level is 2, the number of target stations is 50, when the congestion level is 3, the number of target stations is 75, and when the congestion level is 4, the number of target stations is 100.

Figure 6:
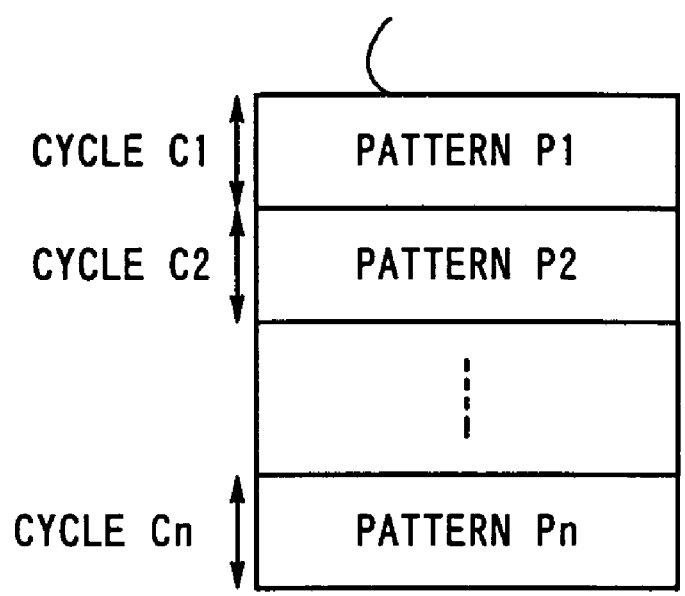
FIG. 6 is a diagram showing a regulation pattern selection table.

FIG. 6 shows the regulation pattern selection table T4 in which a pattern (to be discussed later with reference to FIG. 7) to be selected for each cycle is set. In the figure, for example, when the process cycle in the communication apparatus is C1, the pattern is P1, when the process cycle is C2, the pattern is P2, and when the process cycle is Cn, the pattern is Pn.

FIG. 7 shows the order-of-regulation-targets table T5, which is comprised of a plurality of patterns P1 to Pn with caller numbers set in each pattern. The caller numbers are numbers affixed to signals that are transmitted from the stations 2-1 to 2-n and are identical to identification numbers of the stations 2-1 to 2-n.

In each pattern, a station with the highest regulation priority is placed at the uppermost position and stations with lower regulation priorities are placed under in order. In the pattern P1, for example, the station with a caller number #1 is to be regulated earliest and the station with a caller number #m is to be regulated latest.

Figure 8:
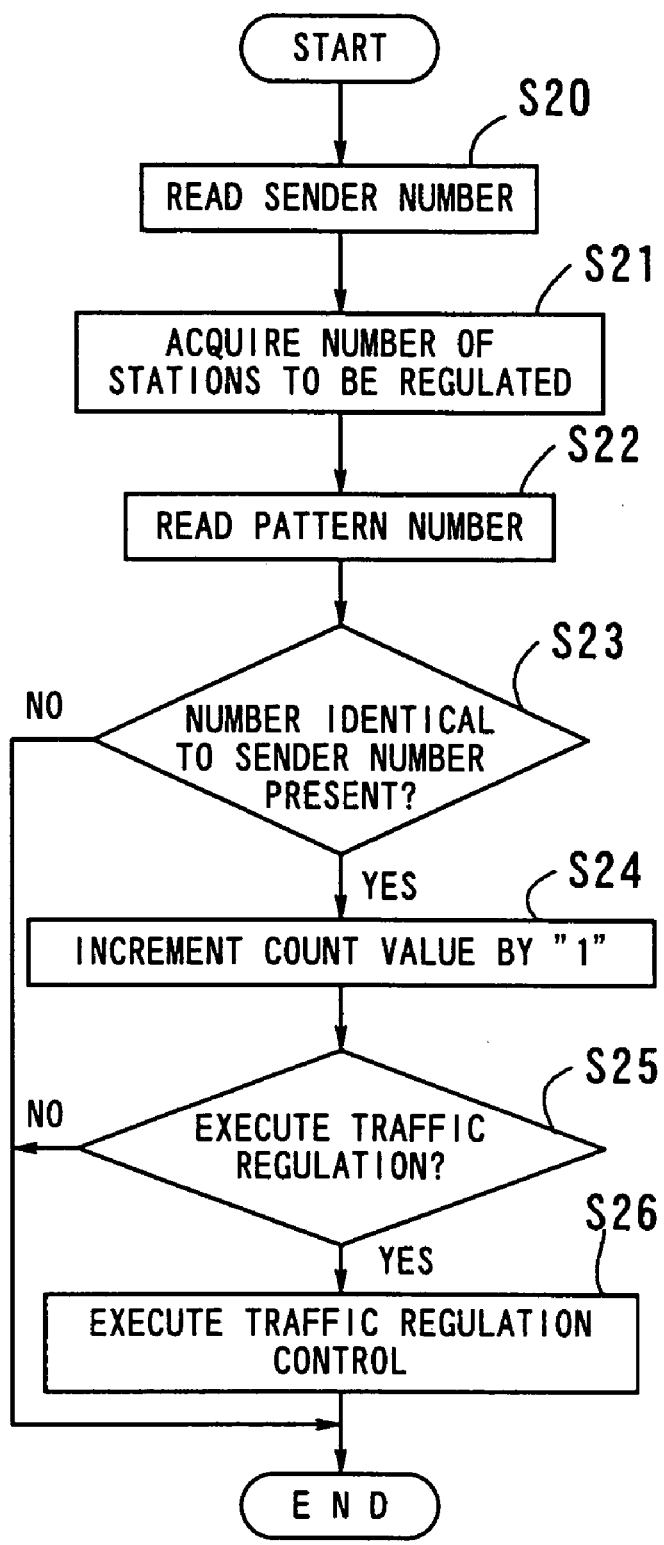
FIG. 8 is a flowchart illustrating procedures of traffic regulation control.

A traffic regulation control which is carried out by the regulation control section 14 will be discussed below. FIG. 8 is a flowchart illustrating procedures of the traffic regulation control.

(S20) The regulation control section 14 reads a caller number in a received signal.

(S21) By using the number-of-regulation-targets table T3, the regulation control section 14 acquires the number of stations to be regulated which correspond to the congestion level. In this example, it is assumed that the congestion level is 1 and the number of stations to be regulated is identified as "25".

(S22) The regulation control section 14 reads a pattern number from the regulation pattern selection table T4. It is assumed here that the process cycle is C1 and the pattern P1 of the cycle C1 has been read out.

(S23) The caller numbers of the top 25 stations in the pattern P1 contained in the order-of-regulation-targets table T5 (the top n stations in the selected pattern when the number of stations to be regulated is identified as "n") are searched for any caller number which is identical the received caller number. If there is such a caller number, the flow proceeds to step S24. Otherwise, the process will be terminated.

(S24) The count value of a regulation counter provided in the regulation control section 14 is incremented by "1".

(S25) Based on the count value accumulated in step S24, the regulation control section 14 further determines whether or not to execute traffic regulation control. (This decision will be discussed later with reference to FIG. 9.) In the case of performing traffic regulation control, the flow proceeds to step S26. Otherwise, the process will be terminated.

(S26) The regulation control section 14 performs traffic regulation control on the associated station. For example, the regulation control section 14 discards the received signal or sends an error signal.

As apparent from the above, the regulation control section 14 is so designed as to periodically change target stations to be regulated and the number of target stations by using the number-of-regulation-targets table T3, the regulation pattern selection table T4 and the order-of-regulation-targets table T5. This can permit traffic regulation control to be executed without regulating only a specific station over a long period of time, so that congestion can be avoided efficiently.

A description will now be given of a regulation determining logic using the count value of the regulation counter. FIG. 9 shows one example of the regulation determining logic.

By using the regulation counter, the regulation control section 14 counts a signal from a station to be regulated upon every reception. The regulation control section 14 divides the count value at the instant of counting by "4" and acquires the quotient and the remainder.

As shown in FIG. 9, when the quotient is equal to or smaller than "250", regulation is carried out only when the remainder is "3". That is, until 1000 signals are received, 25% of the received signals are regulated.

When signals are further received and the quotient lies between "251" and "500", 50% of the received signals are regulated by performing regulation when the remainder is odd. When signals are further received and the quotient lies between "501" and "750", 75% of the received signals are regulated by regulating those signals whose remainder is other than "0". When the quotient becomes equal to or greater than "751", 100% of the received signals are regulated.

The regulation control section 14 of the invention is designed in such a way as to increase the regulation ratio with the same congestion level as the number of received signals increases, thereby reducing the load. This can allow for gradual traffic regulation control and permit congestion to be efficiently avoided.

Figure 10:
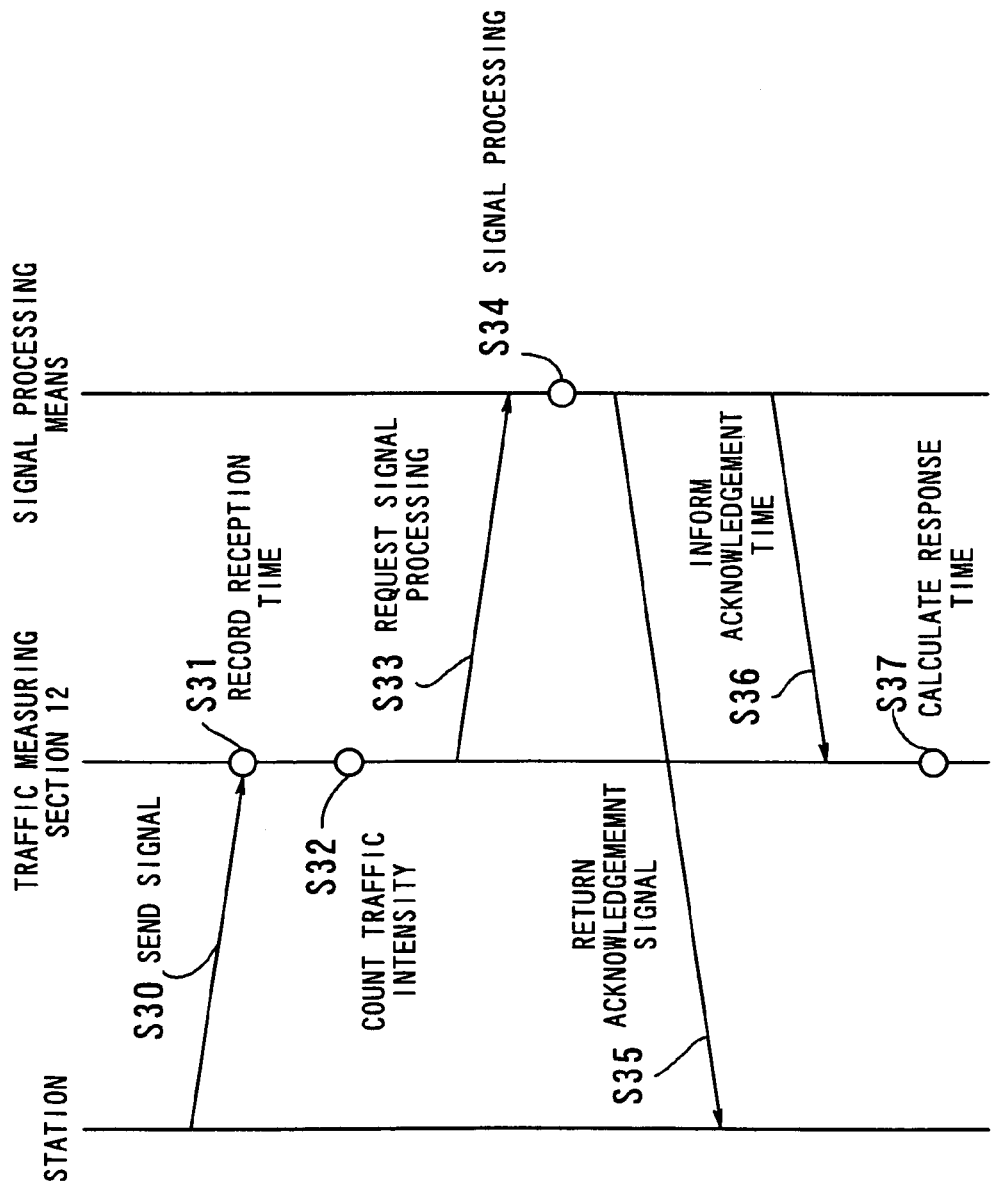
FIG. 10 is a diagram illustrating procedures of traffic measurement and computation of the response time.

The traffic measuring section 12 and signal processing means will be discussed below. The signal processing means is included in the communication apparatus. The signal processing means processes signals received from the stations 2-1 to 2-n and returns acknowledgement signals to the stations 2-1 to 2-n. FIG. 10 illustrates procedures of traffic measurement and computation of the response time.

(S30) A station sends a signal to the communication apparatus 1.

(S31) The traffic measuring section 12 records the time of reception of the signal from the station.

(S32) The traffic measuring section 12 increments the traffic intensity by "1".

(S33) The traffic measuring section 12 requests the signal processing means to perform signal processing.

(S34) The signal processing means processes the signal sent from the station.

(S35) The signal processing means returns an acknowledgement signal to the station.

(S36) The signal processing means records the time of returning the acknowledgement signal and informs the traffic measuring section 12 of the time of acknowledgement.

(S37) The traffic measuring section 12 calculates the response time from the reception time and the acknowledgement time and stores the result in the memory.

Figure 11:
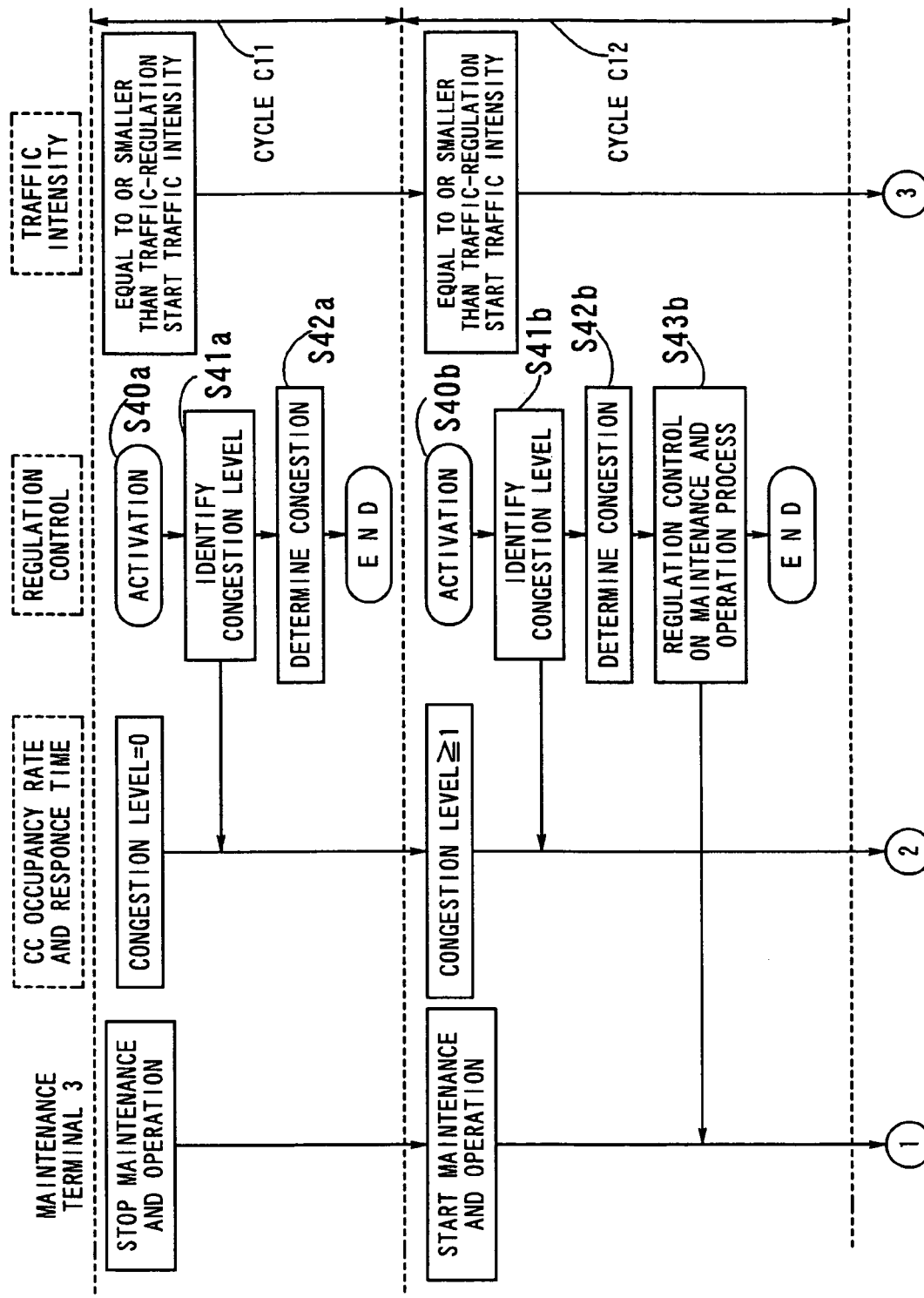
FIG. 11 is a diagram showing the first part of regulation control when congestion is caused by the maintenance and operation process.
Figure 12:
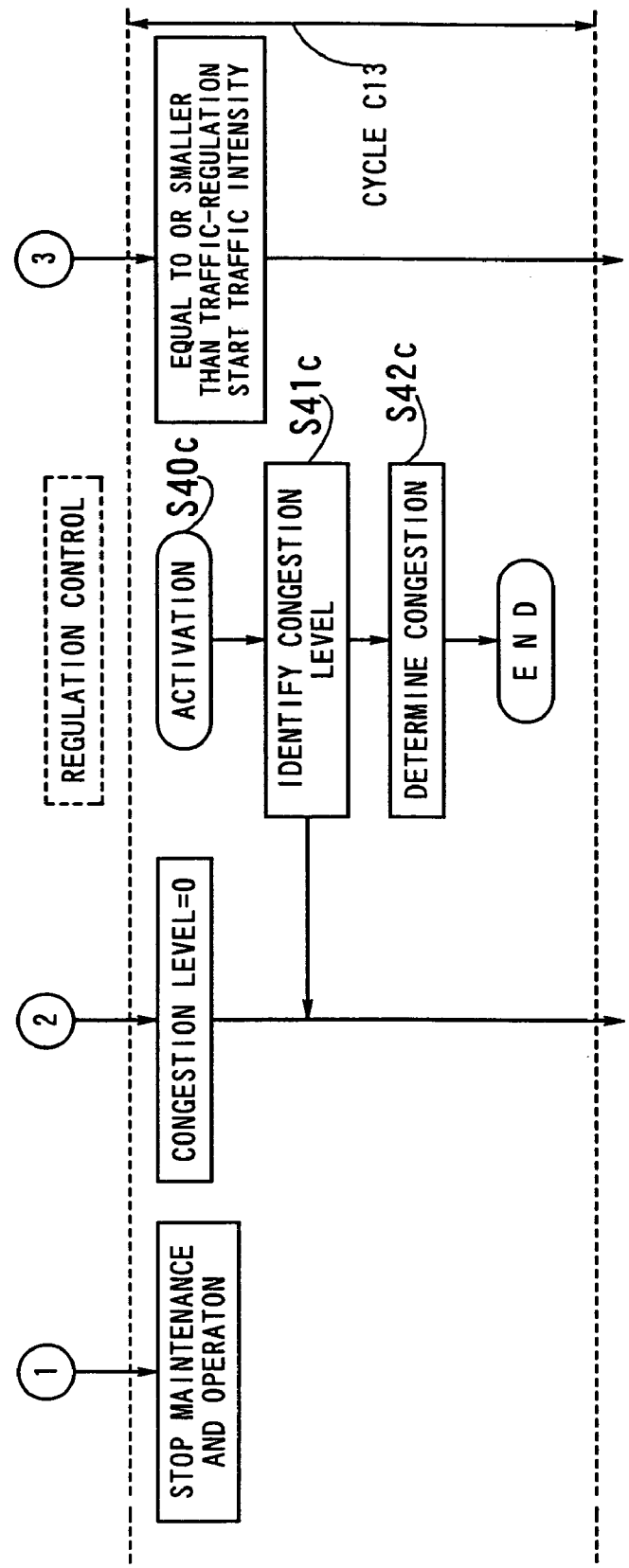
FIG. 12 is a diagram showing the second part of regulation control when congestion is caused by the maintenance and operation process.

A description will now be given of a process which is performed when congestion originates from the maintenance and operation process. FIGS. 11 and 12 show regulation control when congestion is caused by the maintenance and operation process.

The cycle C11 is the case where the maintenance and operation process has not started yet, the congestion level is equal to "0" and the congestion monitoring section 11 is activated when the traffic intensity is equal to or smaller than the value where regulation should be executed (hereinafter referred to as "traffic-regulation start traffic intensity").

(S40a) The congestion monitoring section 11 is activated with the cycle C11.

(S41a) The congestion monitoring section 11 reads and identifies the congestion level.

(S42a) The congestion monitoring section 11 determines whether congestion has occurred or not. As the congestion level=0 here, a process associated with regulation will not be carried out.

The cycle C12 is the case where the maintenance and operation process has started, the congestion level is equal to or greater than "1" and the congestion monitoring section 11 is activated when the traffic intensity is equal to or smaller than the traffic-regulation start traffic intensity.

(S40b) The congestion monitoring section 11 is activated with the cycle C12.

(S41b) The congestion monitoring section 11 reads and identifies the congestion level.

(S42b) The congestion monitoring section 11 determines whether congestion has occurred or not. As the congestion level≧1 here, the congestion monitoring section 11 determines that there is congestion.

(S43b) As the traffic intensity is equal to or smaller than the traffic-regulation start traffic intensity, the regulation control section 14 does not execute traffic regulation control but performs regulation control on the maintenance and operation process.

The cycle C13 is the case where the maintenance and operation process has stopped, the congestion level is equal to "0" and the congestion monitoring section 11 is activated when the traffic intensity is equal to or smaller than the traffic-regulation start traffic intensity.

(S40c) The congestion monitoring section 11 is activated with the cycle C13.

(S41c) The congestion monitoring section 11 reads and identifies the congestion level.

(S42c) The congestion monitoring section 11 determines whether congestion has occurred or not. As the congestion level=0 here, a process associated with regulation will be terminated.

Figure 13:
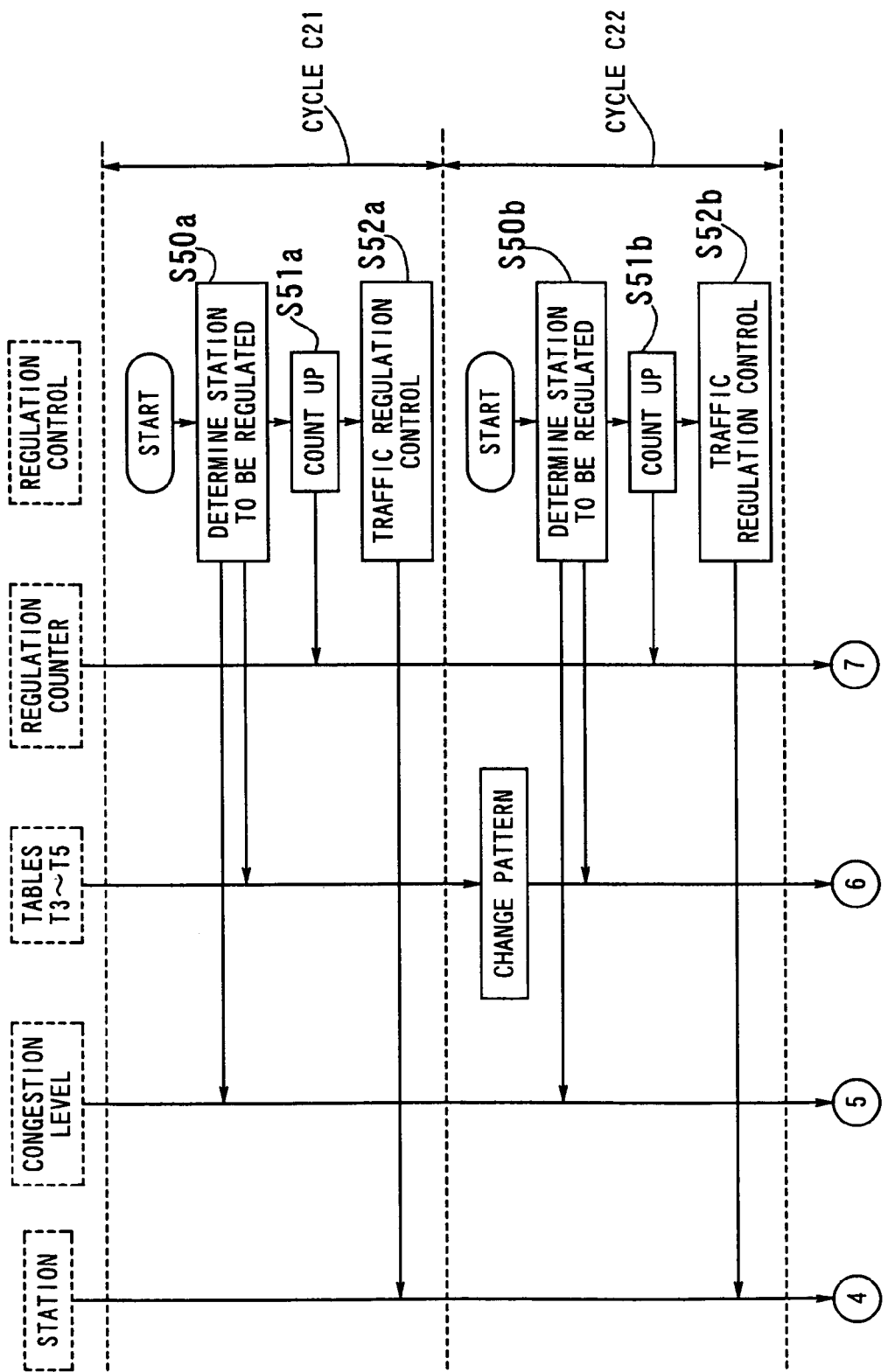
FIG. 13 is a diagram showing the first part of regulation control when congestion is caused by an increase in traffic.
Figure 14:
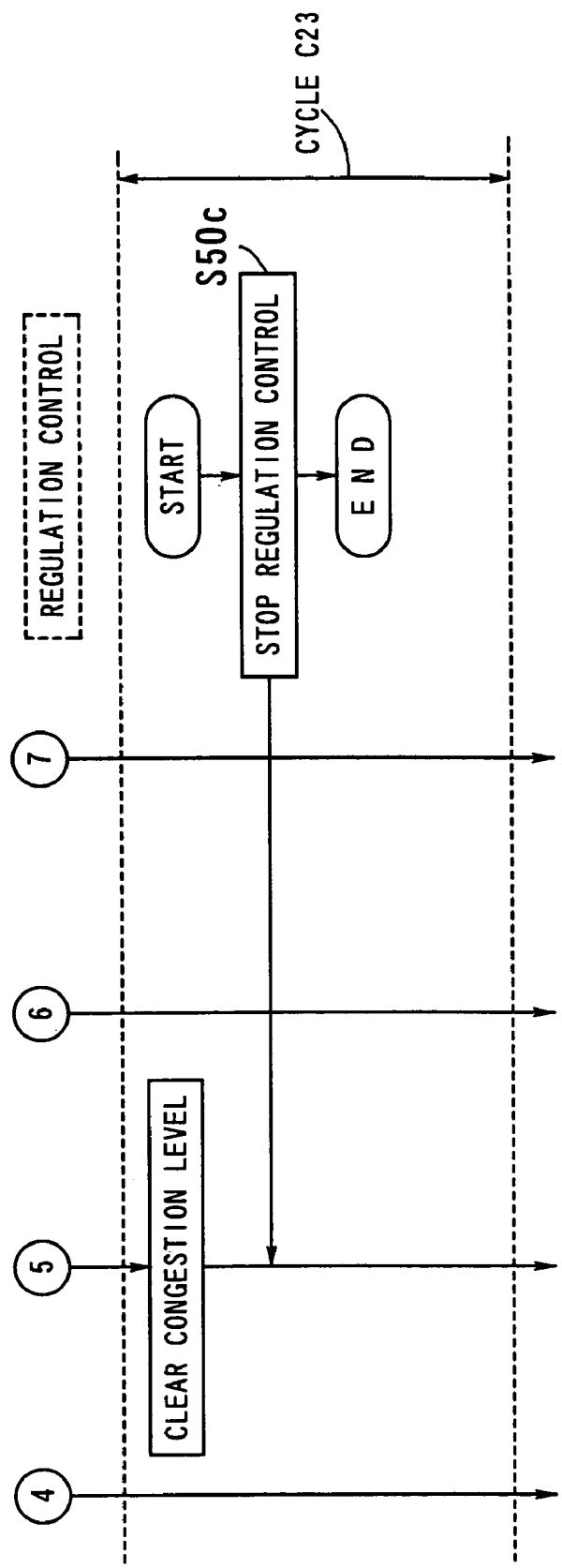
FIG. 14 is a diagram showing the second part of regulation control when congestion is caused by an increase in traffic.

A description will now be given of a process which is performed when congestion originates from the traffic. FIGS. 13 and 14 show regulation control when congestion is caused by an increase in traffic.

The cycle C21 is the case where the traffic intensity exceeds the traffic-regulation start traffic intensity so that traffic regulation control is executed.

(S50a) After reading the current congestion level, the regulation control section 14 determines a station to be regulated by using the number-of-regulation-targets table T3, the regulation pattern selection table T4 and the order-of-regulation-targets table T5.

(S51a) The count value of the regulation counter in the regulation control section 14 is incremented by "1".

(S52a) The regulation control section 14 performs traffic regulation control on the station. The sequence of the processes is carried out every time a call is received.

The cycle C22 is the case where the traffic intensity exceeds the traffic-regulation start traffic intensity so that traffic regulation control is executed but a pattern different from the pattern in the cycle C21 is selected.

(S50b) After reading the current congestion level, the regulation control section 14 determines a station to be regulated by using the number-of-regulation-targets table T3, the regulation pattern selection table T4 and the order-of-regulation-targets table T5.

(S51b) The count value of the regulation counter in the regulation control section 14 is incremented by "1".

(S52b) The regulation control section 14 performs traffic regulation control on the station. The sequence of the processes is carried out every time a call is received.

The cycle C23 is the case where the congestion level is cleared and regulation control will be stopped.

(S50c) The regulation control section 14 reads the current congestion level and recognizes that the level is cleared. The regulation control section 14 then stops the regulation control. The sequence of the processes is carried out every time a call is received.

Figure 15:
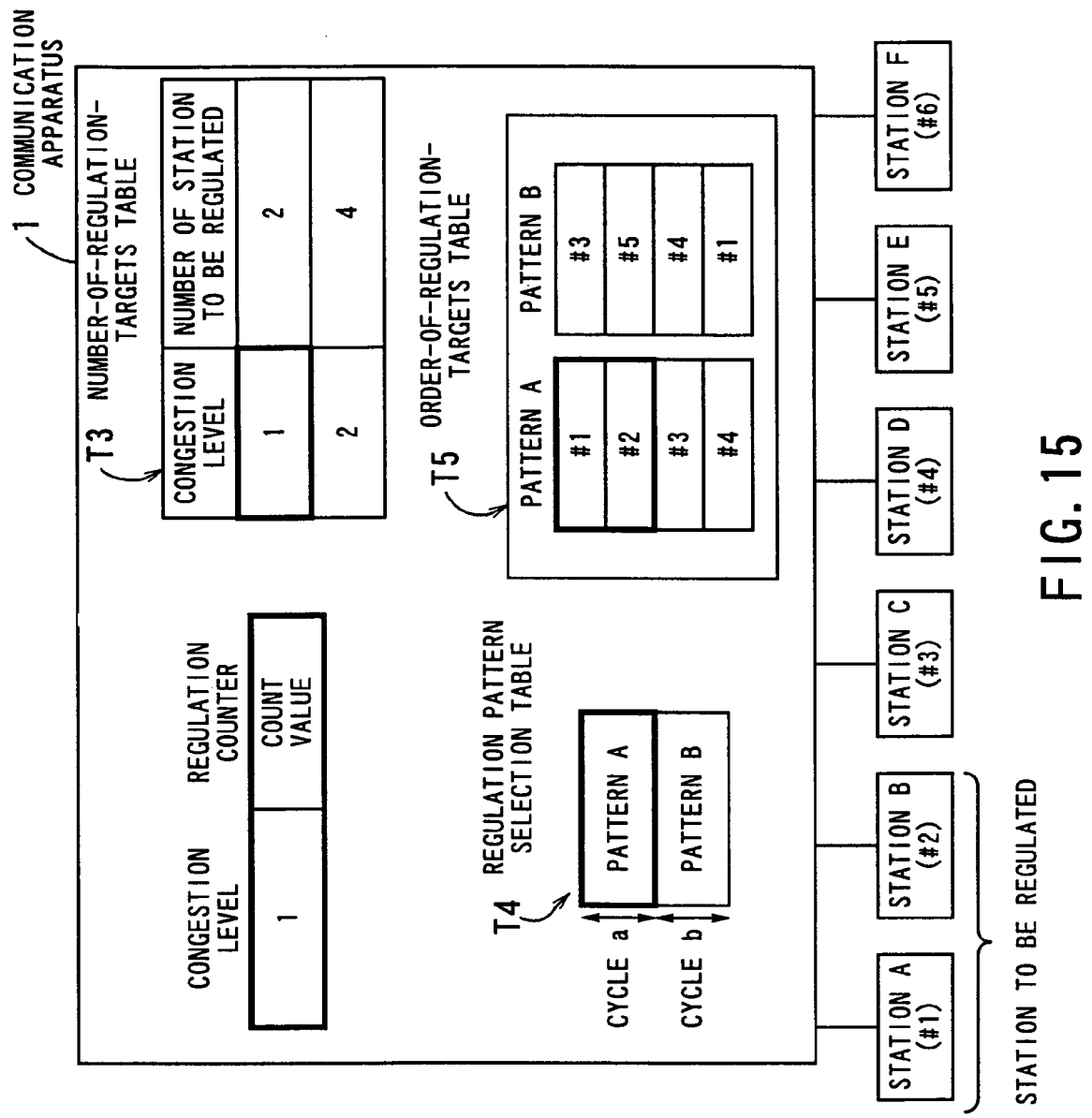
FIG. 15 is a diagram for explaining the operation of traffic regulation control performed by the communication apparatus.
Figure 16:
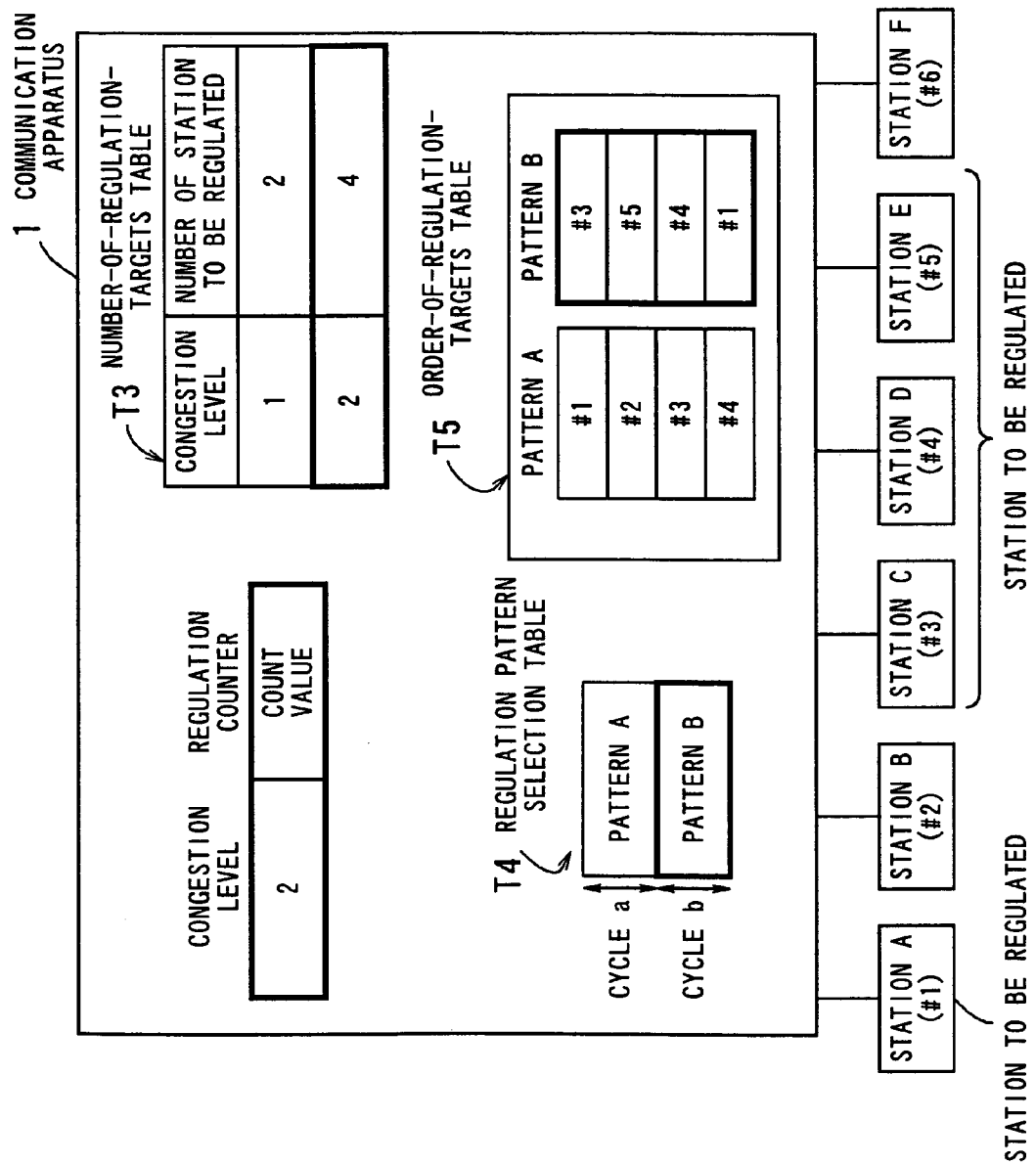
FIG. 16 is a diagram for explaining the operation of traffic regulation control performed by the communication apparatus.

The operation of the traffic regulation control will be discussed below with reference to specific setting examples. FIGS. 15 and 16 are diagrams for explaining the operation of the traffic regulation control performed by the communication apparatus 1. FIG. 15 shows the system processing in a cycle a and FIG. 16 shows the system processing in a cycle b.

The communication apparatus 1 connects to six stations A to F and communicate with them. Identification numbers #1 to #6 are given to the stations A–F in order. The individual constituting sections which are included in the communication apparatus 1 and have been discussed earlier with reference to FIG. 1 are omitted from the diagrams.

Referring to FIG. 15, the congestion monitoring section 11 sets the congestion level to "1" based on the CC occupancy rate and the response time. Then, the regulation control section 14 designates the pattern A of the cycle a in the regulation pattern selection table T4. Because of the congestion level 1, the regulation control section 14 identifies that the number of stations to be regulated is "2".

Accordingly, the regulation control section 14 selects the pattern A in the order-of-regulation-targets table T5 and decides to execute traffic regulation control on the top two stations A and B with the identification numbers #1 and #2 in the pattern A.

The ratio of those in the signals received from the stations A and B which are to be regulated is gradually increased from 25% to 50%, 75% and 100% by accumulation of the count value of the regulation counter and accordance with the ratio computing logic illustrated in FIG. 9.

Referring to FIG. 16, the congestion monitoring section 11 sets the congestion level to "2" based on the CC occupancy rate and the response time. Then, the regulation control section 14 designates the pattern B of the cycle b in the regulation pattern selection table T4. Because of the congestion level 2, the regulation control section 14 identifies that the number of stations to be regulated is "4".

Accordingly, the regulation control section 14 selects the pattern B in the order-of-regulation-targets table T5 and decides to execute traffic regulation control on the station C with the identification number #3, the station E with the identification number #5, the station D with the identification number #4 and the station A with the identification number #1 from the top in the pattern B.

The ratio of those in the signals received from the stations C, E, D and A which are to be regulated is gradually increased from 25% to 50%, 75% and 100% by accumulation of the count value of the regulation counter and accordance with the ratio computing logic illustrated in FIG. 9.

The setting of the order-of-regulation-targets table T5 will now be discussed. The contents of the order-of-regulation-targets table T5 can be set to arbitrary values by an operator. It is assumed that the station A is located in an area of lots of traffic and the station in an important area where government offices or the like are situated.

In such a case, if the station A is set at the topmost position in the pattern A and the station D is set at the bottommost position, the priority of traffic regulation on the station A can be set high while the priority of traffic regulation on the station D can be set low.

To avoid long traffic regulation control over the same station, one should prepare the pattern B in which the position of the station A is set lower. If traffic regulation control can be performed on the same station, it is unnecessary to generate a plurality of patterns (the pattern A alone is sufficient). The arbitrary alteration of the contents of the table can ensure flexible traffic regulation control.

Figure 17:
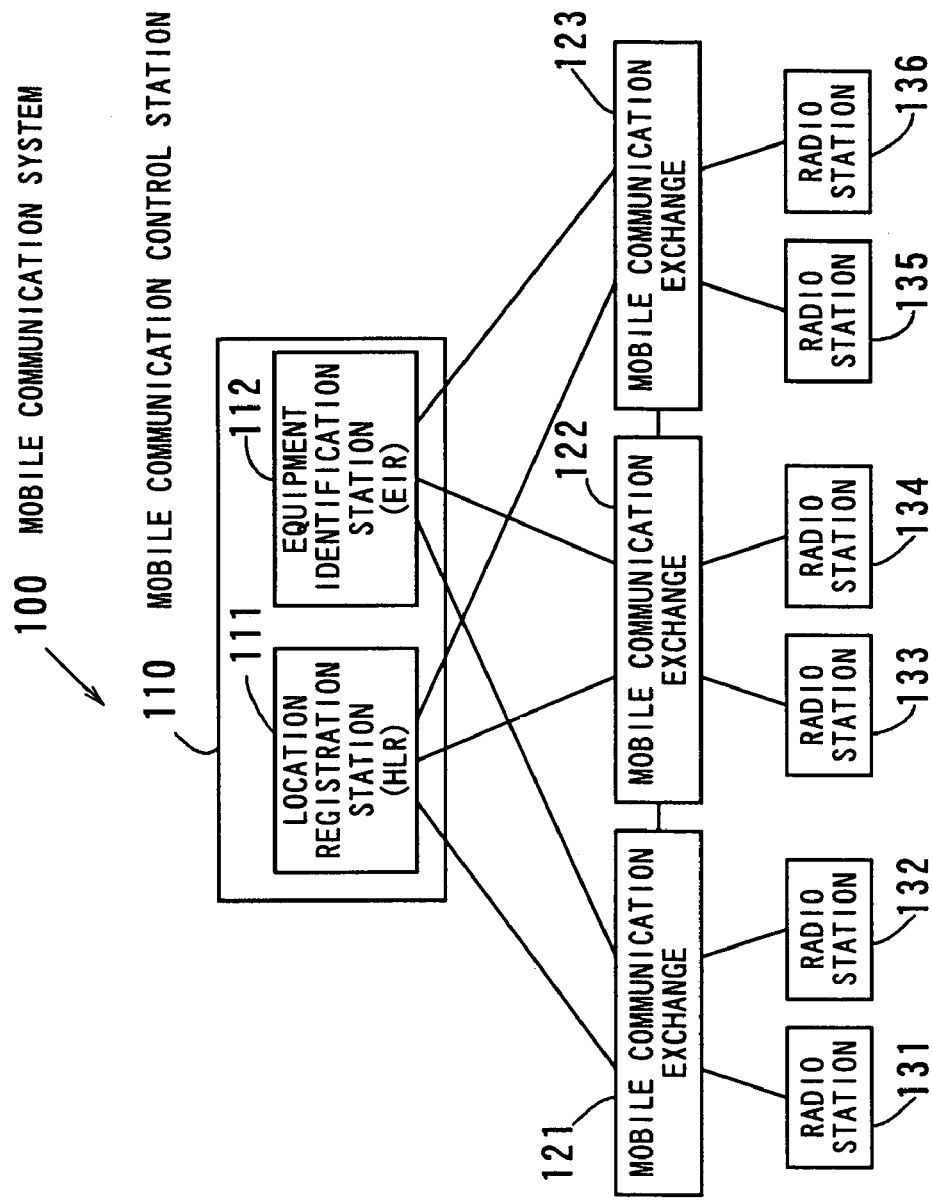
FIG. 17 is a diagram depicting the structure of a mobile communication system.

A mobile communication system (100) to which the communication apparatus 1 of the invention is adapted will be described below. FIG. 17 depicts the structure of the mobile communication system 100.

The mobile communication system 100 comprises a mobile communication control station 110, radio stations 131 to 136 which are connected to unillustrated radio equipments, such as portable telephones, and mobile communication exchanges 121 to 123 which perform exchange control on signals with respect to the radio stations 131–136.

The mobile communication control station 110 comprises a location registration station (HLR: Home Location Register) 111 and an equipment identification station (EIR: Equipment Identity Register) 112.

The location registration station 111 manages location registration data for identifying area where radio equipments are located. The equipment identification station 112 manages the serial numbers that are assigned to radio equipments. Managing the serial numbers makes it possible to determine whether a radio equipment in question is communicatable or not and to prevent the illegitimate use of the radio equipment. The communication apparatus 1 of the invention is provided in the location registration station 111 and the equipment identification station 112.

The location registration station 111 is connected to the mobile communication exchanges 121–123. So is the equipment identification station 112. The mobile communication exchange 121 is connected to the mobile communication exchange 122, which is further connected to the mobile communication exchange 123.

The mobile communication exchange 121 is connected to the radio stations 131 and 132, the mobile communication exchange 122 is connected to the radio stations 133 and 134, and the mobile communication exchange 123 is connected to the radio stations 135 and 136. As a transmission medium, an optical fiber cable or the like is used.

As apparent from the foregoing description, the communication apparatus 1 of the invention is provided in, for example, the location registration station 111 and the equipment identification station 112 in the mobile communication control station 110 that manages multiple mobile communication exchanges 121–123 which are connected to the mobile communication system 100. This system structure can efficiently avoid congestion with respect to a mobile communication network.

Figure 18:
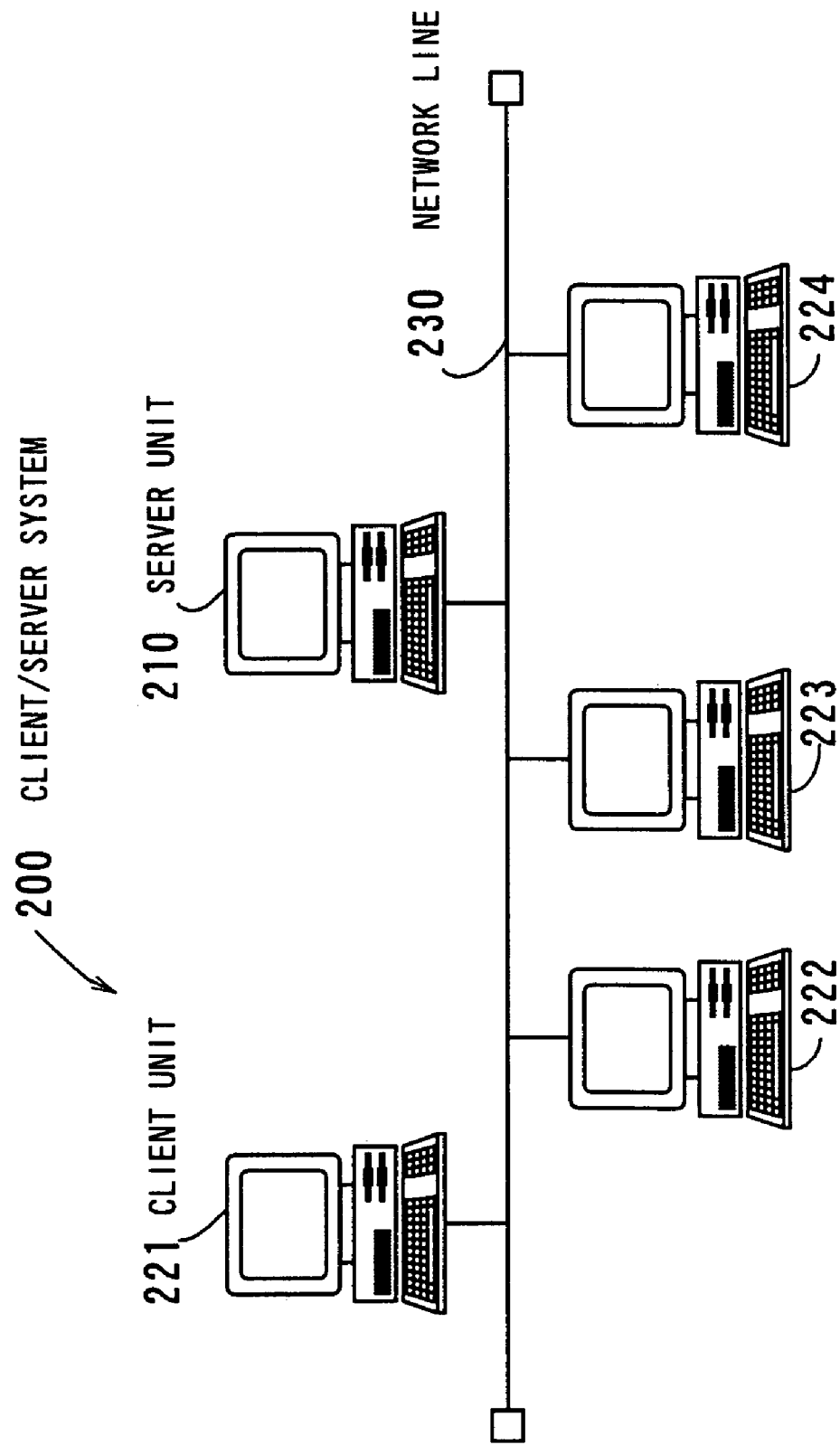
FIG. 18 is a diagram showing the structure of a client/server system.

A description will now be given of a client/server system to which the communication apparatus of the invention is adapted. FIG. 18 shows the structure of a client/server system 200. The client/server system 200 comprises a server unit 210 which provides services and client units 221 to 224 which request services. The server unit 210 is connected to the client units 221–224 by a network line 230, such as an optical fiber cable, in the form of a bus in the figure.

The communication apparatus 1 of the invention is provided in the server unit 210 that manages multiple client units 221–224 which are connected to the client/server system 200. This structure can efficiently avoid congestion with respect to a computer distributed processing network.

Figure 19:
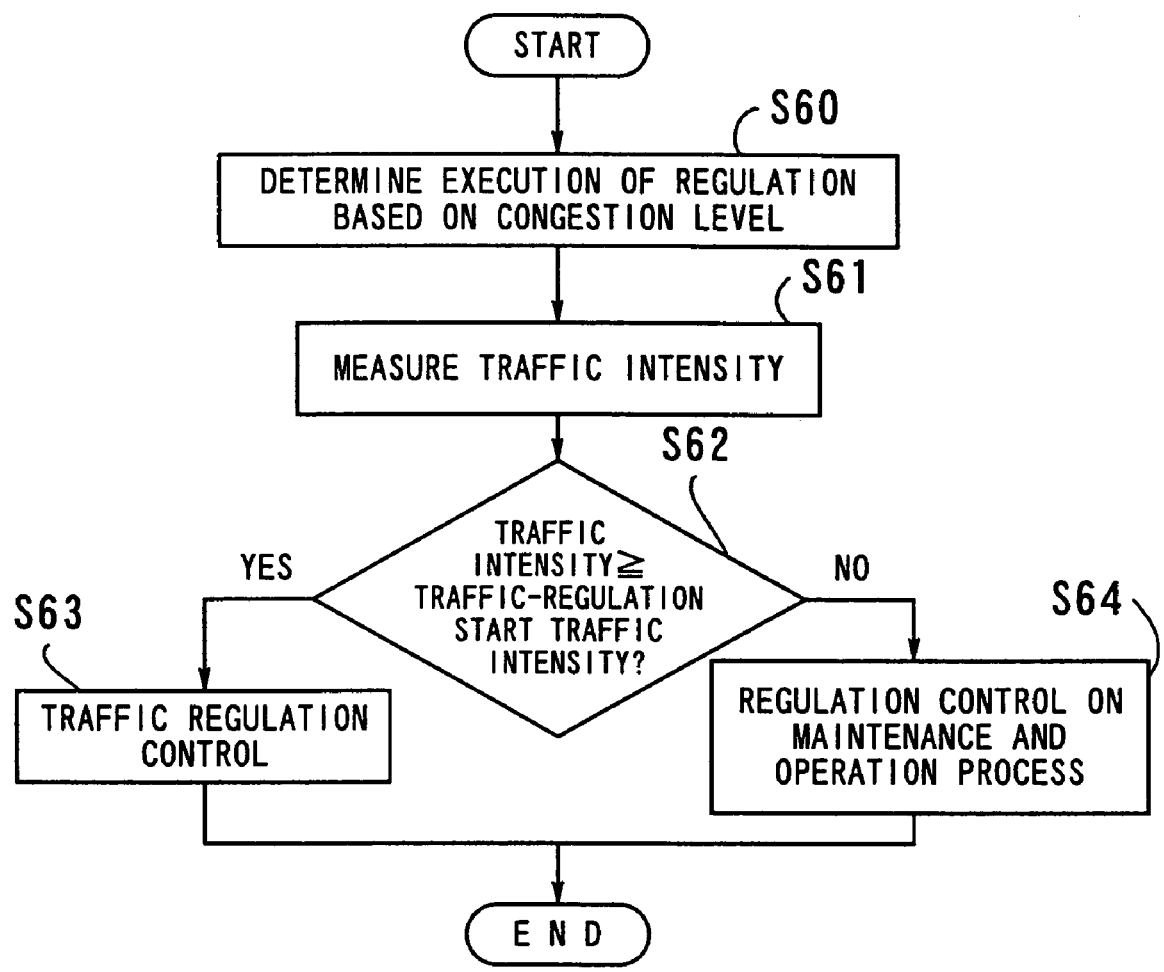
FIG. 19 is a flowchart illustrating procedures of a congestion regulation control method according to the invention.

A description will now be given of the congestion regulation control method according to the invention. FIG. 19 is a flowchart illustrating procedures of the congestion regulation control method of the invention.

(S60) The congestion regulation control method monitors the congestion state, sets the congestion level and determines whether or not to perform regulation based on the congestion level.

(S61) The number of received signals is measured as a traffic intensity.

(S62) When it is determined that regulation should be performed, the traffic intensity is compared with a preset traffic-regulation start traffic intensity. When the comparison result shows the traffic intensity equal to or greater than the traffic-regulation start traffic intensity, the flow proceeds to step S63. and performing regulation control on a maintenance and operation process when the traffic intensity is smaller than the traffic-regulation start traffic intensity, on the other hand, the flow proceeds to step S64.

(S63) Traffic regulation control is executed.

(S64) Regulation control is performed on the maintenance and operation process.

At least one of the processor occupancy rate and the response time with respect to the received signal is used as an index at the time of setting the congestion level.

In implementing traffic regulation control, target stations to be regulated and the number of the target stations are changed. Further, the number of signals received from a station to be regulated is counted and the ratio of a signal to be regulated is computed from the count value, whereby the traffic regulation control is executed with the same congestion level in accordance with the ratio.

According to the communication apparatus and the congestion regulation control method of the invention, as described above, regulation control is carried out by changing target stations to be regulated and the number of the target stations. This makes it possible to avoid congestion without regulating the entire network at a time or without regulating a certain station alone.

It is also possible to reduce the number of subscribers to be regulated and the frequency of occurrence of congestion per subscriber. This can suppress a reduction in communication services over the entire network.

Further, diverse regulation patterns can be set by properly changing the settings of the regulation pattern selection table T4 and the order-of-regulation-targets table T5 The invention does not always regulate a station whose traffic is heavy, but gives priority to signals from stations in a disaster area where the traffic is heavy when a disaster occurs and regulates stations in other light-traffic areas, thereby preventing system congestion. It is therefore possible to achieve flexible regulation that regulates stations in light-traffic areas and sets signals from stations in an important area free of regulation.

As the communication apparatus and congestion regulation control method of the invention can be introduced only in those stations in a network which execute congestion control and the other stations in the network can be left unchanged, realizing the system requires less cost and the introduction needs a shorter period.

The set values in the various tables T1–T5 discussed in the above can be arbitrarily set by an operator. Although the communication apparatus 1 is adapted to a mobile communication system or a client/server system in the foregoing description, the invention can easily adapted to any network which ensure communication of signals whose senders can be identified.

For example, the communication apparatus 1 may be provided in a service control point (SCP) in an intelligent network to control congestion.

As apparent from the foregoing description, the communication apparatus of the invention is designed to implement either traffic regulation control or regulation control on the maintenance and operation process at the time of congestion based on the relationship between the measured traffic intensity and the preset traffic-regulation start traffic intensity. As regulation control on the maintenance and operation process as well as traffic regulation control can be carried out at the time of congestion, it is possible to make the regulation control more flexible, thereby ensuring efficient high-quality communication.

Further, the congestion regulation control method of the invention likewise executes either traffic regulation control or regulation control on the maintenance and operation process at the time of congestion based on the relationship between the measured traffic intensity and the preset traffic-regulation start traffic intensity. This can allow regulation control on the maintenance and operation process as well as traffic regulation control to be carried out at the time of congestion. It is therefore possible to make the regulation control more flexible, thereby ensuring efficient high-quality communication.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A communication apparatus for communicating with a plurality of stations and executing regulation control at a time of congestion, comprising:
    a congestion monitoring unit to monitor a congestion state, setting a congestion level and determining whether or not to perform regulation based on said congestion level;
    wherein said congestion monitoring unit uses at least one of a processor occupancy rate and a response time with respect to a received signal as an index at a time of setting said congestion level,
    a traffic measuring unit to measure a traffic intensity;
    wherein said traffic measuring unit measures the number of signals received from the stations as a traffic intensity,
    a traffic comparison unit to compare said traffic intensity with a preset traffic-regulation start traffic intensity when it is determined that regulation is to be performed; and
    a regulation control unit to perform traffic regulation control when a comparison result shows that said traffic intensity is equal to or greater than said traffic-regulation start traffic intensity, and performing regulation control on a maintenance and operation process when said traffic intensity is smaller than said traffic-regulation start traffic intensity;
    wherein said regulation control means sends an alarm to a maintenance terminal to stop the maintenance and operation process, when the traffic regulation control is performed;
    and wherein said regulation control unit executes said traffic regulation control by changing stations to be regulated and a number of said stations to be regulated;
    and wherein said regulation control unit includes a regulation pattern selection table which is comprised of patterns P1 to Pn set every cycle C1 to Cn of the processor and an order-of-regulation-targets table which is comprised of patterns P1 to Pn with identification numbers of the stations set in each pattern,
    and wherein if the cycle number of the processor is $Ca(1 \leq a \leq n)$ while the traffic regulation control is performed, said regulation control unit reads the pattern Pa of the same number as the cycle Ca of the processor from the regulation pattern selection table and selects the top N stations in the selected pattern by using the order-of-regulation-targets table, when the number of stations to be regulated is identified "N".

2. The communication apparatus according to claim 1, wherein said regulation control unit counts a number of signals received from a station to be regulated and computes a ratio of a signal to be regulated from a count value, whereby said regulation control unit executes said traffic regulation control with a same congestion level in accordance with said ratio.

3. A mobile communication system for communicating with a plurality of stations and executing regulation control at a time of congestion, comprising:
    a plurality of mobile communication exchanges for performing exchange control on signals with respect to radio stations; and
    a mobile communication control station including a communication apparatus comprising a congestion monitoring unit to monitor a congestion state, setting a congestion level and determining whether or not to perform regulation based on said congestion level, a traffic measuring unit to measure a number of signals received from said mobile communication exchanges as a traffic intensity, a traffic comparison unit to compare said traffic intensity with a preset traffic-regulation start traffic intensity when it is determined that regulation is to be performed, and a regulation control unit to perform traffic regulation control when a comparison result shows that said traffic intensity is equal to or greater than said traffic-regulation start traffic intensity, and performing regulation control on a maintenance and operation process when said traffic intensity is smaller than said traffic-regulation start traffic intensity,
    wherein said congestion monitoring unit uses at least one of a processor occupancy rate and a response time with respect to a received signal as an index at a time of setting said congestion level,
    and wherein said traffic measuring unit measures the number of signals received from the stations as a traffic intensity,
    and wherein said regulation control unit sends an alarm to a maintenance terminal to stop the maintenance and operation process, when the traffic regulation control is performed;
    and wherein said regulation control unit executes said traffic regulation control by changing mobile communications exchanges to be regulated and a number of said mobile communication exchanges to be regulated;

and wherein said regulation control unit includes a regulation pattern selection table which is comprised of patterns P1 to Pn set every cycle Cl to Cn of the processor and an order-of-regulation-targets table which is comprised of patterns P1 to Pn with identification numbers of the stations set in each pattern, and wherein if the cycle number of the processor is Ca($1 \leq a \leq n$) while the traffic regulation control is performed, said regulation control unit reads the pattern Pa of the same number as the cycle Ca of the processor from the regulation pattern selection table and selects the top N stations in the selected pattern by using the order-of-regulation-targets table, when the number of stations to be regulated is identified "N".

4. The mobile communication system according to claim 3, wherein said regulation control unit counts a number of signals received from a mobile communication exchange to be regulated and computes a ratio of a signal to be regulated from a count value, whereby said regulation control unit executes said traffic regulation control with a same congestion level in accordance with said ratio.

5. A client/server system for communicating with a plurality of clients and executing regulation control at a time of congestion, comprising:

a plurality of client units for requesting services;

a server unit comprising a congestion monitoring unit to monitor a congestion state, setting a congestion level and determining whether or not to perform regulation based on said congestion level, a traffic measuring unit to measure a number of signals received from said client units as a traffic intensity, traffic comparison means for comparing said traffic intensity with a present traffic-regulation start traffic intensity when it is determined that regulation is to be performed, and a regulation control unit to perform traffic regulation control when a comparison result shows that said traffic intensity is equal to or greater than said traffic-regulation start traffic intensity, and performing regulation control on a maintenance and operation process when said traffic intensity is smaller than said traffic-regulation start traffic intensity, wherein said congestion monitoring unit uses at least one of a processor occupancy rate and a response time with respect to a received signal as an index at a time of setting said congestion level, and wherein said traffic measuring unit measures the number of signals received from the stations as a traffic intensity, and wherein said regulation control unit sends an alarm to a maintenance terminal to stop the maintenance and operation process, when the traffic regulation control is performed;

and wherein said regulation control unit executes said traffic regulation control by changing client units to be regulated and a number of said client units to be regulated;

and wherein said regulation control unit includes a regulation pattern selection table which is comprised of patterns P1 to Pn set every cycle Cl to Cn of the processor and a order-of-regulation-targets table which is comprised of patterns P1 to Pn with identification number of the stations set in each pattern, and wherein if the cycle number of the processor is Ca($1 \leq a \leq n$) while the traffic regulation control is performed, said regulation control unit reads the pattern Pa of the same number as the cycle Ca of the processor from the regulation pattern selection table and selects the top N stations in the selected pattern by using the order-of-regulation-targets table, when the number of stations to be regulated is identified "N".

6. The client/server system according to claim 5, wherein said regulation control unit counts a number of signals received from a client unit to be regulated and computes a ratio of a signal to be regulated from a count value, whereby said regulation control unit executes said traffic regulation control with a same congestion level in accordance with said ratio.

* * * * *